United States Patent [19]

Paakkunainen

[11] 4,283,821

[45] Aug. 18, 1981

[54] METHOD FOR PRODUCING FIBER ROLLS

[75] Inventor: Eero Paakkunainen, Järvenpää, Finland

[73] Assignee: Oy Wartsila AB, Helsinki, Finland

[21] Appl. No.: 103,220

[22] Filed: Dec. 13, 1979

[30] Foreign Application Priority Data

Dec. 29, 1978 [FI] Finland .................................. 784040

[51] Int. Cl.³ .................. B21D 39/18; B29C 27/00; B29D 3/00; B29D 31/00

[52] U.S. Cl. ........................................ 29/129; 29/130; 29/132; 156/153; 156/291; 156/295; 264/262; 264/267; 264/328.1; 428/65

[58] Field of Search ........................ 29/130, 132, 129; 264/155, 261–263, 267, 328.1, 328.3; 428/65; 156/291, 295

[56] References Cited

U.S. PATENT DOCUMENTS

| | | | |
|---|---|---|---|
| 1,854,509 | 4/1932 | Fish | 29/132 |
| 2,367,796 | 1/1945 | Peterson et al. | 29/132 |
| 2,501,629 | 3/1950 | Goulding | 29/130 |
| 2,804,322 | 8/1957 | Herzog | 264/262 |
| 2,987,802 | 6/1961 | Quinn | 29/132 |
| 3,265,799 | 8/1966 | McWhirter | 264/262 |
| 3,291,039 | 12/1966 | Christie | 29/132 |
| 3,555,140 | 1/1971 | Argereu | 264/263 |
| 4,099,312 | 7/1978 | Hill et al. | 29/132 |

Primary Examiner—W. E. Hoag
Attorney, Agent, or Firm—McAulay, Fields, Fisher, Goldstein & Nissen

[57] ABSTRACT

A fiber roll and a method for producing the fiber roll comprising a load carrying shaft portion and having thereon a cover portion made of fiber material. The cover portion is made by subjecting a great number of annular fiber material sheets fitted on the shaft portion to a very strong compression in the axial direction of the roll. The method includes the step of making at least one supply duct leading from an end portion of the roll to the interface of the shaft portion and the cover portion. After the axial compression of the fiber material, a hardening fluid is fed through the supply duct and pressure is applied thereto so as to force the fluid to penetrate between the cover portion and the shaft portion and to fill all possible cavities between the shaft portion and the cover portion.

11 Claims, 2 Drawing Figures

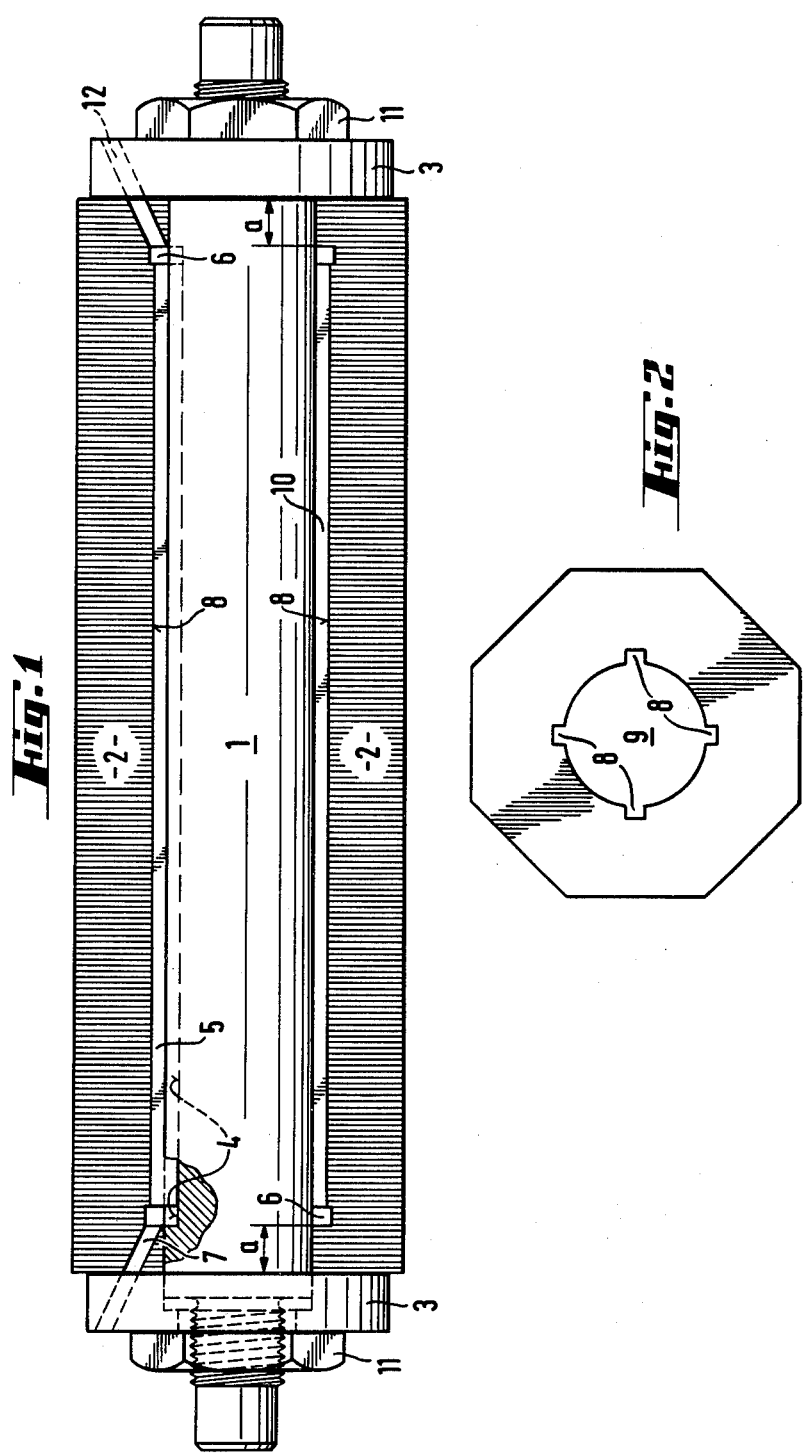

METHOD FOR PRODUCING FIBER ROLLS

The invention relates to a method for producing a so called fiber roll, which roll comprises a shaft portion and a cover portion made of fiber material, for instance of paper, which cover portion is made by compressing in an axial direction of the roll, with a very great force, a great number of annular fiber material sheets fitted on the shaft portion. These kinds of fiber rolls are used in the paper industry in super calenders, in the textile industry in glazing calenders and somewhat also in the plastic industry.

When producing fiber rolls, it has been found that the annular fiber sheets may, due to the great axial compression or for other unexplained reasons, be deformed, so that a cavity is formed between the fiber material and the shaft portion of the roll. Such a cavity is harmful for the function of the fiber roll, and a complete elimination of the cavities has proved to be extremely difficult. The object of the invention is to provide a new method for producing fiber rolls, by means of which eventually occuring air cavities in the fiber roll can be eliminated effectively and at relatively small costs.

The invention is characterized in that at least one supply duct is opened from the end of the roll to the interface of the shaft portion and the cover portion, and that, after the axial compression of the fiber material, a hardening substance is supplied with a suitable pressure inbetween the cover portion and the shaft portion through said supply duct to fill possible cavities between the shaft portion and the cover portion. By this means, a strong and durable roll is obtained, in which there will be no harmful internal cavities, not even after long and hard use. The supply pressure of the hardening filler substance is preferably so chosen, that the cover portion, also after any possible shrinking taking part during the hardening phase of the filler substance, is subject to an internal pressure load.

For leading in the hardening filler substance in a suitable way between the cover portion and the shaft portion of the roll, it is of advantage to provide the annular fiber material sheets with internal notches, which jointly form one, or preferably several, axial channels between the shaft portion and the cover portion. Such a channel is automatically formed, if the notches are equally located in each annular fiber material sheet and if the annular fiber material sheets are guided relative to each other in a conventional way be means of an axial location key in the shaft portion. There are then, in the annular fiber material sheets, one notch for said key and a suitable number of preferably like notches, which form said axial channels. At least at one end of the roll a suitable connection is to be arranged from said supply duct to all of the axial channels. A suitable connection of this kind is obtained by providing an annular space between the shaft portion and the cover portion, which space connects said axial channels to each other and which at the same time is in connection with said supply duct. Instead of using axial channels, a positive clearance between the shaft portion and the annular fiber material sheets can also be used. The use of a clearance can be combined with the use of axial channels.

For sealing the space between the cover portion and the shaft portion of the roll it is of advantage to have, preferably at both ends of the roll, a certain number of annular fiber material sheets tightly pressed on the shaft portion, the fitting of the sheets being so tight, that after compression they are with certainty in tight connection with the shaft portion. It is usually sufficient that these sealing annular fiber material sheets cover a distance of about 50 mm. Said annular space is thereby arranged inside the sealing annular fiber material sheets, as viewed from the ends of the roll. It is also possible to use a separate sealing substance, for instance silicon cement for sealing the ends of the roll, but the method explained above is more simple and it suites naturally the process of producing a fiber roll according to invention. The best way to provide the roll end with a supply duct has usually proved to be to drill the supply duct obliquely from the end of the roll.

As a hardening filler substance, it is of advantage to use epoxy resin or another corresponding or equivalent material. Such a filler substance should be chosen which has a shrinking during its hardening phase or thereafter, that is very small, zero, or even negative, provided that there is such a material otherwise suitable for the purpose. Filler substances being free from vaporizing solution components are most suitable, because the removement of the vaporizing component from the closed space between the shaft portion and the cover portion may cause difficulties. The dynamic viscosity of the filler substance should preferably be about 1.5 to 15 Pas (Pascal seconds).

In addition to the method described above, the invention also relates to a fiber roll produced by means of this method.

In the following, the invention will be described more in detail with reference to the attached drawing, in which FIG. 1 shows an axial section of a fiber roll produced using the method according to the invention, FIG. 2 shows an annular fiber material sheet used for producing the roll.

In the drawing, 1 indicates the shaft portion of a roll and 2 the cover portion of the roll. At the end of the roll, there are flange rings 3, and used for locking, nuts 11, by means of which the very great axial compression, which is influencing cover portion 2 and which has been obtained during the production phase, is maintained. Also other locking means can be used. Shaft portion 1 has a key groove 4, in which a key 5 is fitted, which wholly or at least to that portion which extends above the surface of shaft portion 1 of the roll, is considerably shorter than the actual shaft portion. This key locks the major part of all annular fiber material sheets non-rotatably to shaft portion 1.

By cutting the annular fiber material sheets suitably, an annular space 6 is formed between shaft portion 1 and cover portion 2, preferably at both ends, but possibly only at one end of the roll, into which space at least at one end of the roll a supply duct 7 is led, preferably obliquely from the end of the roll through flange ring 3. A suitable number of notches 8 are cut in the annular fiber material sheets at the edge of central opening 9 of the sheets (FIG. 2). One of these notches takes a position on shaft key 5 and the others form each an axial channel 10 together with the corresponding notches of the other annular fiber material sheets. In this way, a suitable number of axial channels are formed between the shaft portion and the cover portion, into which channels a hardening substance is supplied through supply duct 7 and annular space 6. The air escapes from channels 10 through a boring 12 at the other end, which boring is closable with a screw.

At both ends of the roll there are, at the position of area a, a number of annular fiber material sheets tightly pressed on shaft portion 1, which sheets do not have internal notches and have the purpose of sealing axially the spaces between the shaft portion and the cover portion. In some cases this sealing is not sufficient. It is then recommendable to use suitable sealing substances applied on all contact surfaces where leakage may occur and a sealing element compressed between nut 11 and the end face of shaft portion 1 so as to seal the thread of nut 11. This sealing element may be a ring of relatively soft metal. A sealing ring of suitable design may also be applied in the intersection area of cover portion 2, shaft portion 1 and flange ring 3.

The feed pressure to be used is dependent on the shrinking of the filler substance. In general, feed pressures from 0 to about 10 MPa have proved to be suitable. If a substance having a shrinking of about 4% is used, the feed pump should provide a pressure of the magnitude of 1 MPa or more.

FIG. 2 shows an annular fiber material sheet of a roll according to the invention in the form it has before the fiber roll is turned cylindrical. If its central opening has a diameter of about 400 mm, it will usually be about 1 mm larger when the fiber material is subject to the high axial pressure provided in a roll of this kind. In conventional fiber rolls a tight fit is extremely important, and therefore, annular fiber sheets with a central opening slightly smaller than the shaft portion are forced on the shaft portion, However, the method according to the invention makes it possible to simplify the assembly operation by using fiber sheets having an opening diameter not being smaller than the diameter of the shaft portion. After axial compression, the central openings of the fiber sheets will be slightly larger, as explained above, and there will be a clearance between the fiber sheets and the shaft portion. This clearance is filled with filler substance. It is important that the hardened filler substance is harder than the compressed fiber material.

The invention is not limited to the embodiment shown, but several modifications of the invention are feasible within the scope of the attached claims.

I claim:

1. In a method for producing a fiber roll usable as a calender roll, the roll comprising a load carrying shaft portion and thereon a cover portion made of fiber material forming the outer portion of said roll, said cover portion being made by strong compression of the fiber material, in an axial direction of the roll, of a great number of annular fiber material sheets fitted on said shaft portion, said method including the steps of:
    making at least one supply duct leading from an end portion to said roll to the interface of said shaft portion and said cover portion,
    after said axial compression of the fiber material, feeding a hardenable fluid through said supply duct, and
    applying pressure thereto so as to force said fluid to penetrate between said cover portion and said shaft portion and to fill possible cavities between said shaft portion and said cover portion and hardening said fluid.

2. In a method according to claim 1, including the steps of providing said annular fiber material sheets with internal, notches, positioning said annular fiber material sheets relative to each other so that said notches jointly form one or several axial channels between said shaft portion and said cover portion, and providing, between said shaft portion and said cover portion, a fluid flow connection from said supply duct to said axial channels.

3. In a method according to claim 1 or 2, including the step of providing, at least at one end of said roll, an annular space between said shaft portion and said cover portion, said annular space interconnecting said axial channels.

4. A method according to claim 1, including the step of providing, at both ends of said roll a certain number of annular fiber material sheets pressed on said shaft portion, the fitting of said sheets being so chosen, that after said axial compression they are in tight connection with said shaft portion.

5. A method according to claim 4, including the step of locating said annular spaces inside said thightly fitted fiber material sheets as viewed from the ends of said roll.

6. A method according to claim 1 or 2, including the step of making said supply duct to extend obliquely from an end portion of said roll.

7. A method according to claim 1 or 2, including the step of using an epoxy resin as said hardening fluid.

8. A method according to claim 1 or 2, including the step of using a hardening liquid with a very small shrinkage as said hardening fluid.

9. A fiber roll for use as a calender roll comprising
    a load carrying metal shaft portion and thereon a cover portion made of fiber material, said portion being made by
    applying on said shaft portion a great number of annular fiber material sheets,
    subjecting said sheets to a strong compression in an axial direction of the roll, making at least one supply duct leading from an end portion of said roll to the interface of said shaft portion and said cover portion,
    feeding a hardenable fluid through said supply duct after said axial compression of the fiber material, and applying pressure to said fluid so as to force said fluid to penetrate between said cover portion and said shaft portion and to fill any cavities between said shaft portion and said cover portion and hardening said fluid.

10. The fiber roll as claimed in claim 9, wherein said fiber material sheets are provided with internal notches.

11. The fiber roll as claimed in claim 9, including a supply duct extending obliquely from an end portion of said roll.

* * * * *